(12) United States Patent
Gross et al.

(10) Patent No.: US 7,236,893 B2
(45) Date of Patent: Jun. 26, 2007

(54) ARRANGEMENT FOR VOLTAGE SUPPLY TO SEVERAL USERS AND CONTROLLERS FOR A ON-BOARD NETWORK COMPRISING AT LEAST TWO ENERGY STORES

(75) Inventors: Christof Gross, Weinstadt-Struempfelbach (DE); Jochen Koenig, Sindelfingen (DE); Andreas Loewel, Aidlingen (DE); Franz-Josef Petry, Aidlingen (DE)

(73) Assignee: DaimlerChrysler AG, Stuttgart (DE)

( * ) Notice: Subject to any disclaimer, the term of this patent is extended or adjusted under 35 U.S.C. 154(b) by 24 days.

(21) Appl. No.: 10/517,437

(22) PCT Filed: May 21, 2003

(86) PCT No.: PCT/DE03/01643

§ 371 (c)(1),
(2), (4) Date: Jun. 14, 2005

(87) PCT Pub. No.: WO03/105330

PCT Pub. Date: Dec. 18, 2003

(65) Prior Publication Data

US 2005/0267697 A1 Dec. 1, 2005

(30) Foreign Application Priority Data

Jun. 11, 2002 (DE) .................. 102 25 951

(51) Int. Cl.
G06F 19/00 (2006.01)
(52) U.S. Cl. ............... 702/57; 702/60; 702/64; 320/104; 320/109; 324/433; 324/430; 363/49; 363/147

(58) Field of Classification Search .......... 702/57, 702/60, 64; 320/104, 109; 123/623, 146.5, 123/179.24; 324/433, 430; 307/9.1, 10.1, 307/10.7; 180/65.1, 69.6, 443, 429; 363/49, 363/147
See application file for complete search history.

(56) References Cited

U.S. PATENT DOCUMENTS 5,182,702 A * 1/1993 Hiramatsu et al. .......... 363/132

(Continued)

FOREIGN PATENT DOCUMENTS

DE 40 28 242 A1 9/1990

(Continued)

OTHER PUBLICATIONS

Frister et al., 'New Concepts for Vehicle Electrical System', Apr. 1988, IEEE Publication, pp. 6/1-6/4.*

(Continued)

Primary Examiner—Carol S. W. Tsai
Assistant Examiner—Elias Desta
(74) Attorney, Agent, or Firm—Crowell & Moring LLP

(57) ABSTRACT

An arrangement for supplying voltage to a number of loads for example, in a vehicle includes a vehicle power supply system (6) which has at least two energy stores. A first energy store is connected in a starter circuit element (6a) to a starter (8) for starting an engine; and a second energy store is connected in a load circuit element to the load. The starter circuit element is connected to the load circuit element via a coupling element, and loads which are classified as being safety-relevant can be connected to the starter circuit element via an additional coupling element.

5 Claims, 3 Drawing Sheets

U.S. PATENT DOCUMENTS

| | | | | |
|---|---|---|---|---|
| 5,488,283 A | * | 1/1996 | Dougherty et al. | 307/10.1 |
| 6,321,707 B1 | * | 11/2001 | Dunn | 123/179.3 |
| 6,765,312 B1 | * | 7/2004 | Urlass et al. | 307/10.1 |

FOREIGN PATENT DOCUMENTS

| | | |
|---|---|---|
| DE | 196 45 944 A1 | 11/1996 |
| DE | 199 06 305 A1 | 2/1999 |
| DE | 199 21 451 C1 | 5/1999 |
| DE | 199 51 128 A1 | 10/1999 |
| DE | 100 14 243 A1 | 3/2000 |
| DE | 100 33 317 A1 | 5/2000 |
| EP | 1 093 974 A2 | 4/2001 |
| EP | 1 137 150 A2 | 9/2001 |
| FR | 2 739 733 | 10/1995 |
| WO | WO 98/02950 | 1/1998 |

OTHER PUBLICATIONS

MacMinn et al., 'A very High Speed Switched-Reluctance Starter-Generator for Aircraft Engine Applications', 1989, IEEE Publication, pp. 1758-1764.*

Sato et al., 'Contactless Energy Transmission to Mobile Loads by CLIPS-Test Driving of an EV with Starter Batteries', Sep. 1997, IEEE Publication, vol. 33, No. 5, pp. 4203-4205.*

* cited by examiner

ARRANGEMENT FOR VOLTAGE SUPPLY TO SEVERAL USERS AND CONTROLLERS FOR A ON-BOARD NETWORK COMPRISING AT LEAST TWO ENERGY STORES

BACKGROUND AND SUMMARY OF THE INVENTION

This application claims the priority of German patent document 102 25 951.8, filed Jun. 11, 2002 (PCT International Application No. PCT/DE03/01643, filed May 21, 2003), the disclosure of which is expressly incorporated by reference herein.

The invention relates to an arrangement for supplying voltage to a number of loads, particularly in a vehicle, and to a controller for a vehicle power supply system having at least two energy stores.

The development of new components in automobile construction (such as electromagnetic valve control, referred to as EM(VC) and loads such as the electric front windshield heating, as well as the trend to provide electrical drives for components that were previously driven by belts, have increased dramatically the total electrical power consumption of the loads. The resulting increased power demand cannot be covered by a conventional 12 V vehicle power supply system with a 14 V generator voltage. It is thus known to provide a vehicle power supply system having a number of voltage levels (for example 12 V and 42 V), or having a number of batteries. Development is being driven in specific directions by the continuously increasing demands for the availability of the supply for the vehicle power supply system, as well.

For example, German patent document DE 40 28 242 A1 discloses an arrangement for a vehicle power supply system having two batteries, which are connected to one another during normal operation and are disconnected when required. When the two batteries are connected, they are charged simultaneously by a generator. In this case, however, it is impossible to connect the loads in a manner which takes account of the capacity of the batteries.

German patent document DE 100 33 317 A1 discloses an arrangement having a self-latching relay, which switches to an emergency battery to provide an emergency supply to the loads. It is not possible, however, to take account of the amount of charge that is required to be drawn by the respective load. The various loads can thus draw charge from one another. Furthermore, the entire arrangement malfunctions if the relay fails.

Furthermore, German patent document DE 196 45 944 A1 discloses a controller for a vehicle power supply system having at least two batteries which can be charged by a generator. The controller controls a connection between the two batteries such that the connection is opened or closed as a function of data which can be predetermined (for example, recharging of a specific battery). In this case, each battery can be discharged on its own by loads connected to it. This means that the relevant battery cannot provide sufficient capacity for all of the loads at any time.

In order to allow individual loads to be supplied in critical situations, such loads have respective associated separate buffer or emergency batteries, independently of the capacity of the relevant battery. Such dedicated-load buffer batteries are so called primary batteries (non-rechargeable), which have a limited life. Alternatively, the buffer batteries are in the form of rechargeable batteries. Dedicated-load emergency supplies are particularly complex and costly. Furthermore, as a result of the increasing number of electronic loads which require such a backup supply, the space required has increased. Furthermore, such additional emergency supplies are particularly heavy, which leads to increased vehicle fuel consumption.

Finally, German patent document DE 199 21 451 C1 discloses a vehicle power supply system which includes a number of electrical power supply sources (at different voltages) as well as sensor means for detection of failure of an electrical power supply source. The latter operate switching means for connection of an intact electrical power supply source. As the multiple voltage vehicle power supply system, the vehicle power supply system has a number of vehicle power supply system circuits which are operated at different voltages, each having appropriately configured loads. Each vehicle power supply system circuit is continuously connected to its associated electrical power supply source. Furthermore, crossover voltage means are provided, which automatically ensure, in the event of failure or malfunctioning of one vehicle power supply system circuit, that the loads which are connected to this failed vehicle power supply system circuit are supplied from one of the other vehicle power supply system circuits, such that an additional power supply connection is connected to the failed vehicle power supply system circuit from an intact vehicle power supply system circuit.

One object of the present invention is to provide an arrangement for supplying voltage to a number of loads (particularly in a vehicle), which allows individual loads to be provided with an emergency supply in a particularly simple manner.

Another object of the invention is to provide a controller for a vehicle power supply system which has at least two energy stores, and allows individual loads to be provided with an emergency supply in a particularly simple manner.

These and other objects and advantages are achieved by the supply arrangement according to the invention, which is based on the idea that loads can be supplied in a simple manner by dispensing with separate emergency supplies in the form of dedicated-load emergency batteries or rechargeable batteries. The number of electrical loads to be supplied includes, however, both loads which must be supplied even in critical situations, due to their function or for safety reasons, and loads which need be supplied only during normal operation. For this purpose, the arrangement has a vehicle power supply system with at least two energy stores, a first of which is connected in a starter circuit element to a starter for starting an engine, and a second of which is connected in a load circuit element to the loads. The starter circuit element is connected to the load circuit element via a coupling element, and a number of loads which are classified as being safety-relevant can be connected to the starter circuit element via an additional coupling element.

The safety-relevant loads are expediently coupled to the starter circuit element entirely or largely without any quiescent current, by means of the additional coupling element. This ensures that the starter circuit element, and in particular, the energy store which is connected to it (for example a so called starter battery) are largely free of quiescent currents. Particularly when the vehicle is stationary, the generator is switched off or the engine is stationary, the energy store for the starter circuit element is thus discharged only slowly (or not at all) by quiescent currents of connected loads. This allows the energy store to hold an amount of energy which is sufficient to start the vehicle.

A single additional coupling element is preferably associated with each safety-relevant load, which allows individual electrical loads to be switched off (in addition to the slight discharging, or no discharging whatsoever, of the energy store as a result of quiescent currents for safety-relevant loads) if the energy store has insufficient capacity to provide a starting capability. The safety-relevant loads are for this purpose prioritized on the basis of their function, so that individual loads are switched off in a predetermined sequence, as required. In other words: the safety-relevant loads are sorted and switched on in accordance with their ranking. This allows process-dependent (and, furthermore, prioritized) switching, disconnection or connection, of loads, ensuring the functionality of the vehicle and/or the protection of the environment. Furthermore, this technique reliably avoids a dip in the voltage of the energy store or the electrical power supply source, thus allowing particularly advantageous use of the energy store for the starter circuit element.

The coupling element and the additional coupling element are advantageously integrated in a controller, allowing the coupling elements to be arranged in a particularly simple and compact form in the controller. Furthermore, the wiring complexity is low, permitting simple and rapid maintenance of the coupling elements for both circuit elements, and all of the loads.

The controller preferably has at least one means for detection of operating variables which represent the respective circuit elements. A voltmeter and/or an ammeter is provided, for example, for detection of operating variables, in particular for monitoring of both circuit elements and to maintain sufficient capacity in the relevant energy store to ensure that the vehicle can be started. In addition, a clock may be provided to measure the amount of charge drawn from the respective energy store.

Alternatively or additionally, the controller has at least one means for detection of operating variables which represent the respective safety-relevant loads. A voltmeter, an ammeter and/or a clock may be provided for each power output of the respective load, depending on its type and configuration. The amount of charge drawn and, if appropriate, the demand are determined on a load-specific basis from the detected operating variables.

The controller is expediently designed to control the respective coupling element for the circuit elements and/or the safety-relevant loads. For example, if the battery capacity in the starter circuit element is insufficient for current requirements, individual loads can be switched directly (disconnected and/or connected). This allows mutual recharging of the energy store, by means of a controllable DC/DC converter. The controller is preferably in this case designed such that the loads and/or the safety-relevant loads are switched as a function of the detected operating variables.

In one preferred embodiment, the additional coupling element comprises at least one field-effect transistor and a diode. The coupling element which connects the circuit elements is preferably in the form of a switch or field-effect transistor. The use of semiconductor elements for the coupling element is particularly simple and cost-effective.

With regard to the controller for a vehicle power supply system which has at least two energy stores, with a starter circuit element which comprises a first energy store and a starter for starting an engine, and a load circuit element which comprises a second energy store and a number of loads, one coupling element is, according to the invention, provided for coupling the starter circuit element to the load circuit element, and at least one additional coupling element is provided for coupling a number of loads, which are classified as being safety-relevant, to the starter circuit element. A controller designed in this way allows largely variable configuration of the vehicle power supply system structure while providing an adequate emergency supply to safety-relevant loads at the same time.

At least one device for detecting operating variables which represent the circuit elements and/or the loads is expediently provided. In this case, the controller preferably has at least one data processing unit for processing operating variables which represent the circuit elements and/or the loads. The controller can be linked to other bus-compatible controllers in the vehicle by the use of a bus-compatible data processing unit, for example a microprocessor. Furthermore, various types of operating data are interchanged and can be taken into account by means of the associated controller in order to control the vehicle power supply system. In particular, the integration and/or linking of the coupling elements in or at the controller allows other operating variables (such as a rotation speed), or variables which are typical of the vehicle power supply system (such as generator data) to be taken into account in the switching of the coupling elements.

The energy stores in the circuit elements are preferably of a size sufficient to hold the amount of charge required for cold starting of the internal combustion engine or of the engine, only when they are interconnected. This allows the weight and size of the individual energy stores or batteries to be optimized.

One advantage of the invention is that the subdivision of the feed for safety-relevant loads into an operating supply and an emergency supply on the basis of mutually decoupled circuit elements of a vehicle power supply system eliminates the need for dedicated-load. Accordingly, there is also no need for additional emergency batteries, buffer rechargeable batteries and their charging devices. Furthermore, such a redundant feed for safety-relevant loads allows them to be functional in virtually all situations. Such separation of the feed into an emergency supply and a standard supply by means of mutually decoupled circuit elements which are arranged physically separately, ensures that a sufficient supply for the safety-relevant loads is always possible, even if one of the energy stores fails as a result of damage caused by an accident or by an excessive amount of charge being drawn. For example, one of the energy stores together with an associated preferred charging device is in this case designed only to provide the emergency supply. An amount of charge thus made available from the relevant energy store can be distributed between associated power paths for various safety-relevant loads. It has therefore allowed greater availability in the case of an emergency than with individual emergency supplies in the form of buffer batteries.

Other objects, advantages and novel features of the present invention will become apparent from the following detailed description of the invention when considered in conjunction with the accompanying drawings. loads allows them to be functional in virtually all situations. Such separation of the feed into an emergency supply and a standard supply by means of mutually decoupled circuit elements which are arranged physically separately, ensures that a sufficient supply for the safety-relevant loads is always possible, even if one of the energy stores fail as a result of damage caused by an accident or by an excessive amount of charge being drawn For example, one of the energy stores together with an associated preferred charging device is in the case designed only to provide the emergency supply. An amount of charge thus made avialable from the relevent energy store can be distributed between associated power paths for various safty-relevant loads. It has therefore allowed greater availability in the case of an emergency than with individual emergency supplies in the form of buffer batteries Other objects, advantages and novel features of the present invention will become apparent from the following detailed description of the invention when considered in conjunction with the accompanying drawings.

DETAILED DESCRIPTION OF THE DRAWINGS

Parts which correspond to one another are provided with the same reference symbols in all of the figures.

Figure 1:
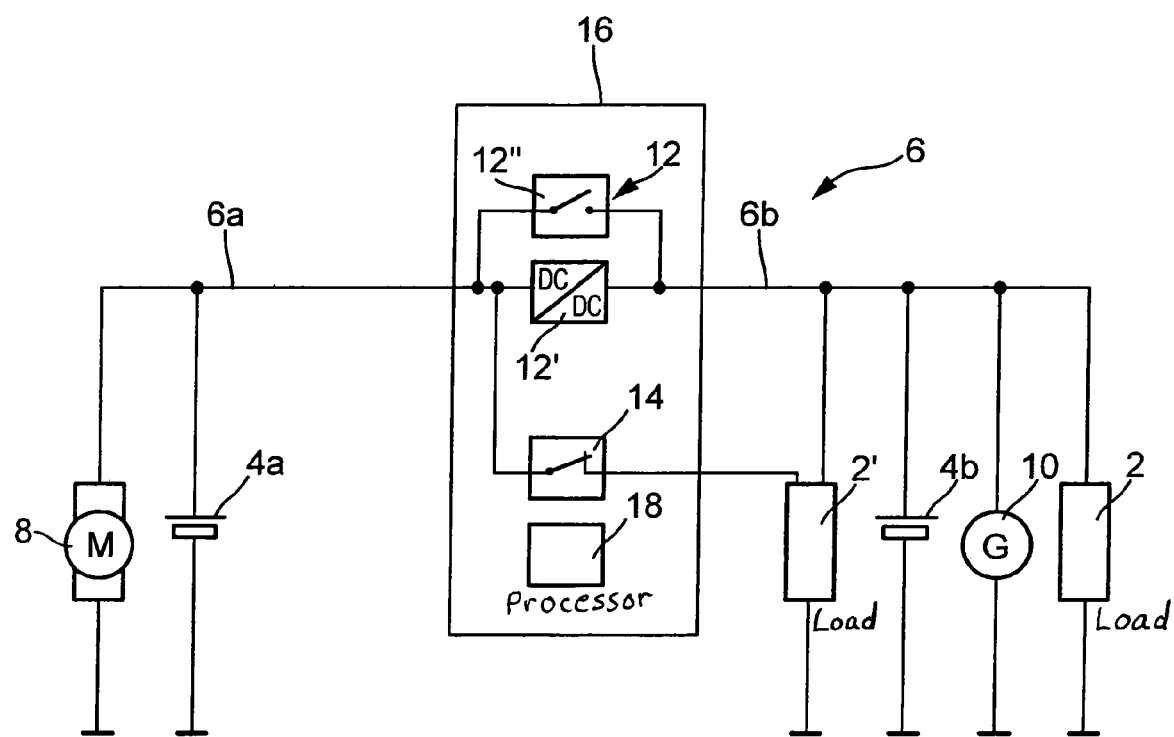
FIG. 1 shows voltage supply according to the invention.

FIG. 1 is a schematic diagram of an arrangement for supplying voltage to a number of loads 2, including two energy stores 4a and 4b which are part of a vehicle power supply system 6. The first energy store 4a is connected in a starter circuit element 6a in the vehicle power supply system 6, to a starter 8 for starting a vehicle engine (not shown). The second energy store 4b is connected in a load circuit element 6b in the vehicle power supply system 6, to the loads 2 and to a generator 10. Further energy stores with a further subdivision of the vehicle power supply system 6 into further circuit elements may be provided, depending on the nature and configuration of the vehicle power supply system 6. The loads 2 may in this case be connected via respective switches, which are not illustrated in any more detail.

A coupling element 12 is provided for decoupling of the two circuit elements 6a and 6b from one another, or for coupling one energy store 4b, for recharging as required, from the other energy store 4a. The coupling element 12 comprises, for example, a DC/DC voltage converter 12' and/or a switch 12'', which may be a semiconductor switching element, such as a field-effect transistor.

Decoupling of the two circuit elements 6a and 6b allows each of them to be controlled on the basis of its function - starter circuit element or load circuit element, respectively. In this case, the load circuit element 6b is used for feeding the associated loads, which are subdivided on the basis of their function into safety-relevant loads 2' and loads 2 which are relevant for normal operation. The starter circuit element 6a, including the associated energy store 4a is used to ensure the capability to start an associated technical system, for example an internal combustion engine.

The energy store 4b (referred to as the load battery), in the load circuit element 6b is discharged continuously by the connected loads 2 and 2' during operation of the arrangement. In order to recharge the energy store 4b, which is in the form of a load battery, the latter is connected to the generator 10, to supply it with energy, during operation of the arrangement.

In order to maintain the supply to the safety-relevant loads 2', even in the event of failure of the energy store 4b, the arrangement 1 has an additional coupling element 14, which connects safety-relevant the loads 2' to the starter circuit element 6a. The additional coupling element 14 is, for example, in the form of a semiconductor element, in particular a field-effect transistor.

The controller 16 performs open-loop and closed-loop control of the vehicle power supply system 6 and its circuit elements 6a and 6b, as well as the loads 2, 2' connected thereto. In order to monitor and control the circuit elements 6a, 6b as well as the loads 2, 2', the controller 16 has a data processing unit 18 (for example a microprocessor). The coupling element 12, the additional coupling element 14 as well as the data processing unit 18 are integrated in the controller 16, depending on the nature and configuration of the arrangement.

Figure 2:
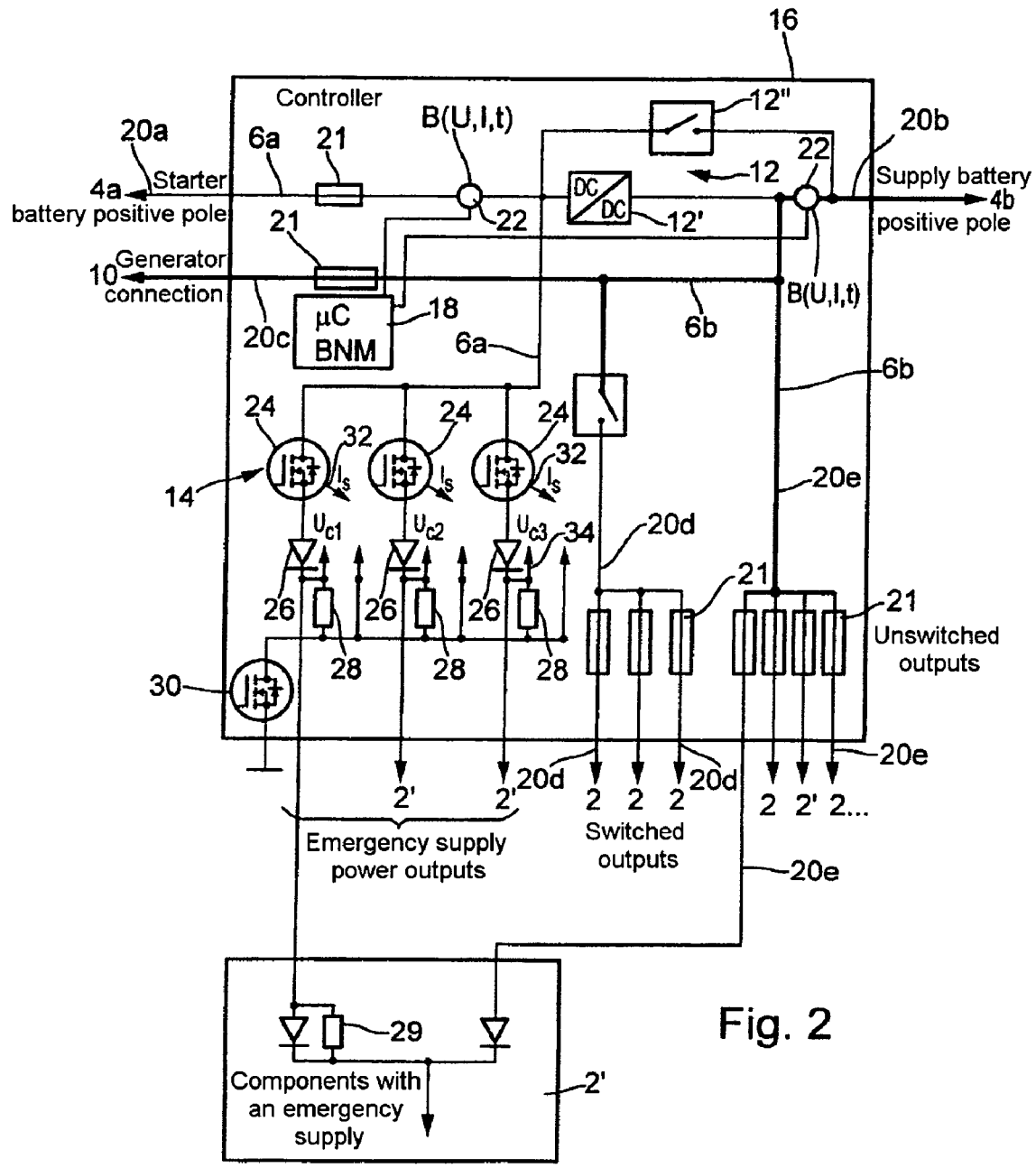
FIG. 2 shows the controller as illustrated in FIG. 1 in detail.

FIG. 2 shows the details of the controller 16, which is connected via a connection 20a to the energy store 4a for the starter circuit element 6a, and via a connection 20b and 20c to the energy store 4b and to the generator 10 for the load circuit element 6b. During normal operation, the loads 2 and loads 2' (the latter being classified as safety-relevant) are fed by means of the load circuit element 6b in the vehicle power supply system 6. In this case, the loads 2 and 2' are connected to the load circuit element 6b for supply purposes via switched connections 20d or unswitched connections 20e. These may be protected or unprotected, depending on the nature and configuration of the outputs or connections 20a to 20e. Particularly safety-relevant connections 20a to 20e (for example the connection 20c), may be protected by means of a protection device 21, such as a so-called pyrotechnic fuse.

In order to monitor the starter circuit element 6a and the load circuit element 6b, the controller 16 in each case has at least one measurement means 22 for detection of operating variables B which characterize the respective circuit element 6a or 6b. For example, the current I, the voltage U and/or the time t is detected by means of the measurement means 22, as the operating variable B. The measurement means 22 for the respective circuit element 6a or 6b for this purpose has, for example, a voltmeter, an ammeter and/or a clock. The state of the associated energy store 4a or 4b is determined and established on the basis of the detected operating variables B(U, I, t) which characterize the respective circuit element 6a or 6b, and are supplied to the data processing unit 18.

In order to provide a redundant connection for the safety related loads 2' in addition to being linked to the load circuit element 6b, they are also connected to the starter circuit element 6a by means of the additional coupling element 14. In this case, the controller 16 has one associated coupling element 14 for each safety-relevant load 2'. In order to further reduce the load on the starter circuit element 6a, and thus to ensure that the relevant energy store 4a has the capacity required for an emergency supply, the safety-relevant loads 2' are coupled to the starter circuit element 6a (entirely or largely without any quiescent current) by means of the respective additional coupling element 14.

The arrangement allows the supply to the safety-relevant load 2' to be monitored by the starter circuit element 6a during vehicle operation without any current flowing, by means of the voltage of the energy store 4a (starter battery) which is applied to the safety-relevant load 2' by the disconnected, additional coupling elements 14, irrespective of whether the load circuit element 6b suddenly fails or is still intact. Any faults are identified and indicated at the appropriate time. The described arrangement represents a three-stage supply concept with supply options which are largely independent of one another, providing a particular advantage. The first stage is normal operation, in which the safety-relevant load 2' is supplied by the load circuit element 6b, and the availability of the supply to the safety-relevant load 2' monitored by the starter circuit element 6a via an associated coupling element 14. If the availability of the load circuit element 6b is constrained, it can be supported via the coupling element 12" by the starter battery and the starter circuit element 6a, in order to ensure the overall supply (stage 2). If a major defect occurs, with total failure of the load circuit element 6b, the starter circuit element 6a and the load circuit element 6b are disconnected by disconnection of the coupling element 12" or of a protection device in addition to the coupling element 12", and the safety-relevant load 2' is supplied only via the starter circuit element 6a from the starter battery (stage 3). Together with the monitoring of the complete path for the supply and emergency supply, this represents a high-availability supply.

For this purpose, the respective coupling element 14 preferably has a field-effect transistor 24 and a diode 26, as well as a resistor 28 connected in parallel with them. A further field-effect transistor 30 may also be provided. The current Is can then be supplied via a connection 32, with the voltage Uc being supplied via a further connection 34, to the data processing unit 18 as the operating variable B for the respective safety-relevant load 2'.

The data processing unit 18 in the controller 16 can thus continuously monitor both the circuit elements 6a, 6b and the safety-relevant loads 2'. For this purpose, it uses the data recorded for the operating variables B(U, I, t) for the circuit elements 6a, 6b and for the safety-relevant loads 2' to determine the amount of charge drawn by each load 2'. Based on this information, the appropriate safety related load 2' is then connected and/or disconnected by means of control signals as a function of the capacity of the energy store 4a or 4b and/or the ranking of that particular safety related load 2' In this case, depending on the state of the energy store 4b used to protect the basic supply (also referred to as the load battery), for example in the event of its failure, the relevant safety related load 2' is connected to the starter circuit element 6a, and thus to the energy store 4a, (in the form of a starter battery), for emergency supply.

In order largely to avoid overloading the starter battery 4a by such an emergency supply during normal operation, the safety related loads 2' are largely coupled without any quiescent current. When the capacity limit of the starter battery 4a is also undershot, individual safety related loads 2' can be disconnected on the basis of their ranking by controlling appropriate coupling elements 14 Alternatively or additionally, an amount of energy (in particular, the required current can be allocated to the respective safety related loads 2' by means of control signals. This prevents different loads 2' from interfering with one another.

Furthermore, a preferred supply to the safety related loads 2' can be imposed by disconnecting coupling elements 14, so that there is no quiescent current on the starter battery. Nevertheless, defects on the paths to the safety-relevant loads 2' can be fully monitored via the arrangement 20e, 29, 28 and 30, (that is, the connections 20e, a resistor 29, resistors 28 and a field-effect transistor 30), with these defects being identified at the connections or outputs 34, which also allow voltage-controlled switching by means of the coupling element 14.

Figure 3:
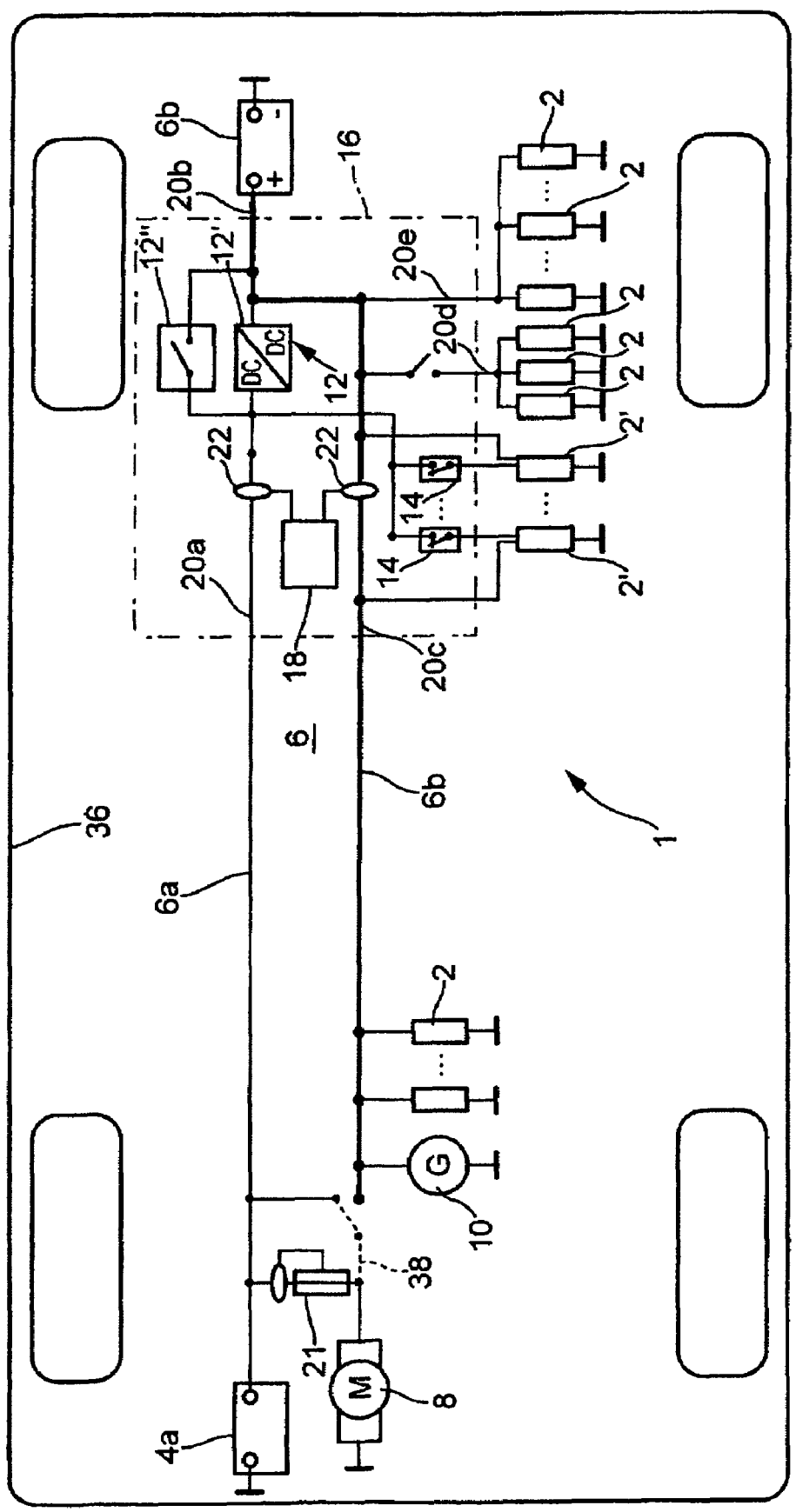
FIG. 3 shows the arrangement for supplying voltage, as shown in FIG. 1, for a vehicle power supply system.

FIG. 3 shows an arrangement 1 for a vehicle power supply system in a vehicle 36. The circuit elements 6a and 6b are arranged physically separately from one another in order to provide a multiple supply that is sufficient for safety-relevant loads 2', even in critical situations. By way of example, the starter circuit element 6a which is required for starting (and has the associated energy store 4a and the starter 8) is arranged at a position in the vehicle 36 that is particularly protected in the event of accidents, and is substantially removed from the load circuit element 6b with the associated energy store 4b, or vice versa. This ensures that, even in the event of failure of one of the two energy stores 4a or 4b, it is possible to supply the safety related loads 2' by coupling the two circuit elements 6a and 6b via the power supply system coupling elements 12. The controller 16 is preferably likewise arranged at a point in the vehicle 36 which is particularly protected in the event of accidents.

Depending on the nature and configuration of the arrangement 1, the energy stores 4a and 4b may be of such a size that they charge sufficient for cold starting only when interconnected. A switching element 38, which couples the two energy stores 4a and 4b to one another, is provided for this purpose. Such sizes of the energy stores 4a and 4b with respect to them having a small individual capacity allows low costs and, in particular, a light weight.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An apparatus for supplying voltage to a plurality of loads in a vehicle having a vehicle power supply system which includes at least a first energy store that is connected in a starter circuit element to a starter for starting an engine, and a second energy store that is connected in a load circuit element to load components, said apparatus comprising:

a controller including a data processing unit, and a coupling element that is operable to connect the starter circuit element to the load circuit element;

additional coupling elements, each of which is operable to connect one safety related load to the starter circuit element; and a measurement device for providing data from which the data processing unit can determine a state of the respective energy stores in the starter and load circuit elements, and data concerning current flowing through and voltage across a safety related load, whereby the data processing unit can continuously monitor a state of each respective energy store for the starter and load circuit elements as well as the safety related loads, and the paths to the safety related loads, and the data processing unit can also control switching of at least one of the coupling element and the additional coupling elements, in response to said state; wherein:

the data processing unit uses voltage of the first energy store, which is applied to respective safety related loads by associated disconnected coupling elements, for current-free monitoring and determination of the availability of supply to the respective safety-relevant load independently of the state of the load circuit element; and the controller drives at least one of a coupling element and a safety device corresponding to determined availability of the supply.

2. The arrangement as claimed in claim 1, wherein:

in a normal operating mode, when it is determined that the load circuit element is fully available, the controller controls switching of the coupling element such that the safety-relevant load is supplied only by the load circuit element;

in a second operating mode, when it is determined that the load circuit element is not fully available, the controller controls switching of the coupling element such that the load circuit element is supported via the coupling element by the first energy store and the starter circuit element, in order to ensure an entire supply; and in a third operating mode, when it is determined that the load circuit element has failed completely, the controller controls switching of the coupling element such that the coupling element is disconnected or a safety device in addition to the coupling element achieves disconnection from the starter circuit element and the load circuit element, and the safety-relevant load is supplied only via the starter circuit element from the first energy source.

3. The arrangement as claimed in claim 2, wherein the data processing unit can perform at least one of the following:

i) determine an amount of charge which is drawn by each safety-relevant load from the data, ii) control at least one of the coupling element and the additional coupling elements as a function of at least one of the state of the energy store and a ranking of the relevant safety-relevant load, and iii) connect or disconnect the safety-relevant load.

4. The arrangement as claimed in claim 3, wherein when the data processing unit determines that the state of the second energy store has fallen below a capacity limit or has failed, the safety-relevant load is connected to the first energy store via the coupling element.

5. The arrangement as claimed in claim 4, wherein when the data processing unit determines that a capacity limit of the first energy store has also been undershot, a respective additional coupling element for the safety related loads is controlled such that individual safety related loads are disconnected on the basis of their ranking.

\* \* \* \* \*